(12) United States Patent
Schnieper et al.

(10) Patent No.: US 8,270,050 B2
(45) Date of Patent: Sep. 18, 2012

(54) SECURITY DEVICE WITH A ZERO-ORDER DIFFRACTIVE MICROSTRUCTURE

(75) Inventors: Marc Schnieper, Onex-Genéve (CH); Alexander Stuck, Wettingen (CH); Harald Walter, Kilchberg (CH)

(73) Assignee: CSEM Centre Suisse d'Electronique et de Microtechnique S.A. (CH)

(*) Notice: Subject to any disclaimer, the term of this patent is extended or adjusted under 35 U.S.C. 154(b) by 282 days.

(21) Appl. No.: 11/659,559

(22) PCT Filed: Aug. 3, 2005

(86) PCT No.: PCT/IB2005/002494
§ 371 (c)(1), (2), (4) Date: Feb. 5, 2007

(87) PCT Pub. No.: WO2006/016265
PCT Pub. Date: Feb. 16, 2006

(65) Prior Publication Data
US 2007/0247714 A1   Oct. 25, 2007

(30) Foreign Application Priority Data
Aug. 5, 2004 (GB) .................... 0417422.3

(51) Int. Cl.
*G03H 1/00* (2006.01)
*G02B 5/18* (2006.01)
(52) U.S. Cl. .............. 359/2; 359/575; 359/34
(58) Field of Classification Search ........... 359/2, 34, 359/575
See application file for complete search history.

(56) References Cited

U.S. PATENT DOCUMENTS

| | | | |
|---|---|---|---|
| 3,526,505 A * | 9/1970 | Kroemer | 430/1 |
| 4,417,784 A | 11/1983 | Knop et al. | |
| 4,484,797 A | 11/1984 | Knop et al. | |
| 4,568,141 A | 2/1986 | Antes | |
| 4,705,356 A | 11/1987 | Berning et al. | |
| 5,032,003 A | 7/1991 | Antes | |
| 5,464,714 A * | 11/1995 | Watanabe et al. | 430/7 |
| 5,712,731 A * | 1/1998 | Drinkwater et al. | 359/619 |
| 5,824,374 A * | 10/1998 | Bradley et al. | 427/555 |
| 6,060,143 A * | 5/2000 | Tompkin et al. | 428/64.1 |

(Continued)

FOREIGN PATENT DOCUMENTS
GB    2 093 404    9/1982
(Continued)

OTHER PUBLICATIONS

Gale, M.T., *Optical Document Security*, $2^{nd}$ Ed., "Zero-Order Grating Microstructures", pp. 267-287.

(Continued)

*Primary Examiner* — Jade R Chwasz
(74) *Attorney, Agent, or Firm* — Fish & Richardson P.C.

(57) ABSTRACT

A security device comprises a zero order diffractive microstructure buried within a substrate. One or more further optical structures, such as microlenses, may be formed on a surface of the substrate. The further optical structures modify the optical characteristics of the zero order diffractive microstructure such as by enhancing or reducing the color effect produced by the zero-order diffractive microstructure upon tilting the security device.

23 Claims, 4 Drawing Sheets

U.S. PATENT DOCUMENTS

| | | |
|---|---|---|
| 6,473,165 B1 | 10/2002 | Coombs et al. |
| 6,943,952 B2 | 9/2005 | Souparis |
| 7,102,823 B2 | 9/2006 | Schilling et al. |
| 2002/0149546 A1* | 10/2002 | Ben-Chorin et al. ........... 345/32 |
| 2003/0058491 A1* | 3/2003 | Holmes et al. ................... 359/2 |
| 2004/0130760 A1 | 7/2004 | Schilling et al. |
| 2004/0135365 A1 | 7/2004 | Schilling et al. |
| 2004/0179266 A1 | 9/2004 | Schilling et al. |
| 2005/0094274 A1 | 5/2005 | Souparis |
| 2005/0128590 A1 | 6/2005 | Schilling et al. |
| 2005/0257270 A1 | 11/2005 | Grassl et al. |

FOREIGN PATENT DOCUMENTS

| | | |
|---|---|---|
| WO | 03/059643 | 7/2003 |
| WO | 03/085425 | 10/2003 |
| WO | WO 03082598 A2 * | 10/2003 |
| WO | 2004/034338 | 4/2004 |
| WO | 2004/076197 | 9/2004 |

OTHER PUBLICATIONS

Gutmann, J.S., et al., Film-Thickness Dependence of Structure Formation in Ultra-Thin Polymer Blend Films, *Applied Physics A: Materials Science & Processing,* 74(1):5463-5465, Dec. 2002.

Moench, W., et al., "Fabrication and testing of micro-lens arrays by all-liquid techniques," *Journal of Optics A: Pure and Applied Optics,* 6(4):330-337, Apr. 2004.

Müller-Buschbaum, P., "Dewetting and pattern formation in thin polymer films as investigated in real and reciprocal space," *Journal of Physics: Condensed Matter,* 15(36):R1549-R1582, Sep. 2003.

Zimmermann, L., et al., "High refractive index films of polymer nanocomposites," *Journal of Materials Research,* 8(7):1742-1748, Jul. 1993.

Great Britain Search Report dated Nov. 18, 2005 for Great Britain Application No. 0515999.1 (1 page).

International Preliminary Report on Patentability dated Feb. 6, 2007 for International Application No. PCT/IB2005/002494, filed Aug. 3, 2005 (6 pages).

* cited by examiner

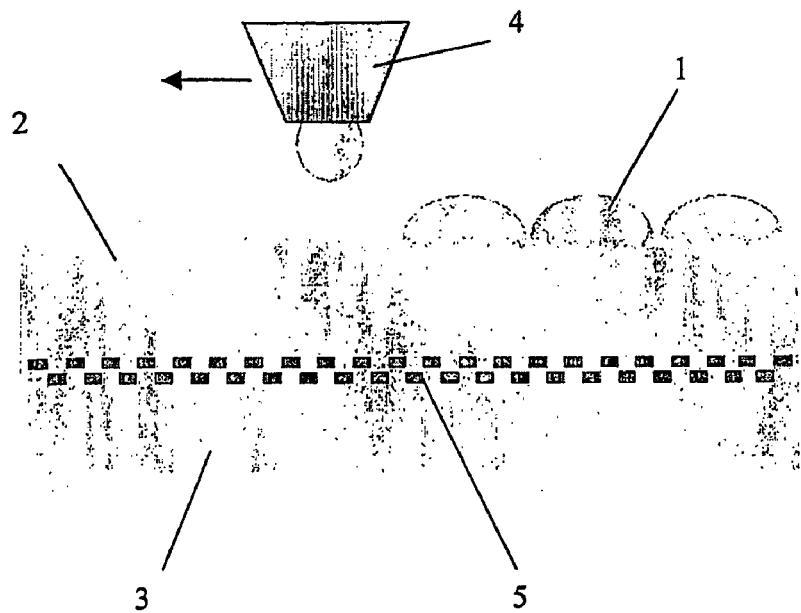
Fig 1
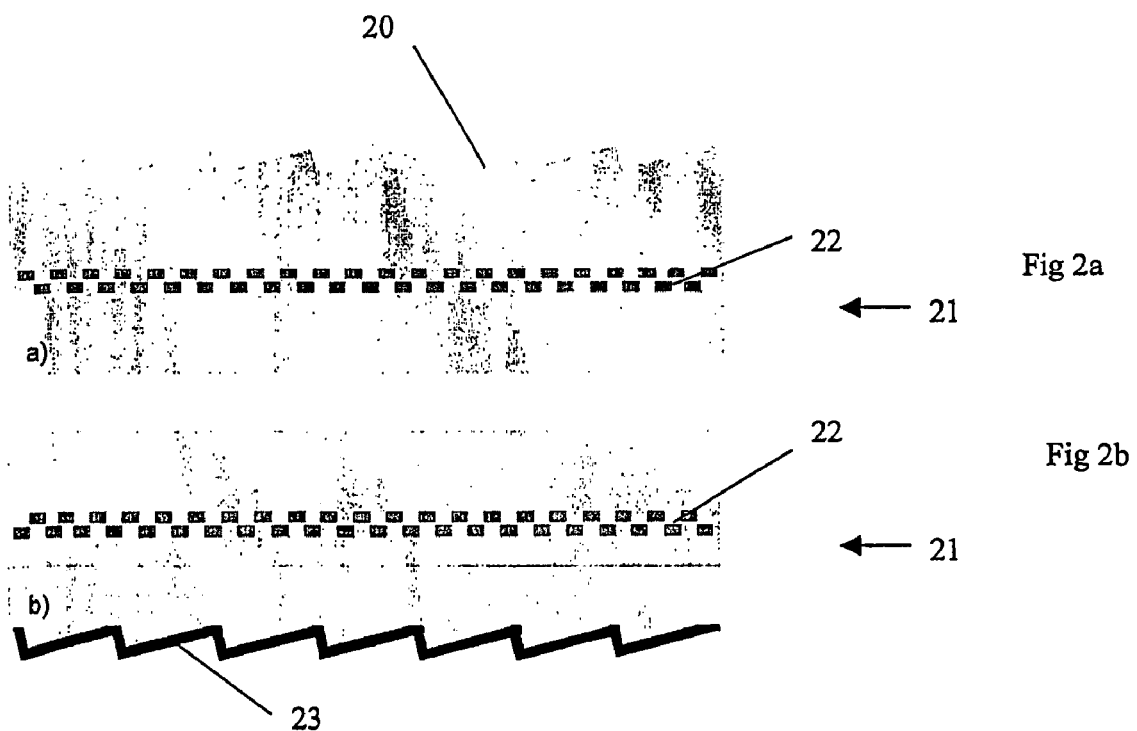
Fig 2a
Fig 2b

SECURITY DEVICE WITH A ZERO-ORDER DIFFRACTIVE MICROSTRUCTURE

BACKGROUND

The invention relates to security devices containing zero-order diffractive microstructures. Such devices may be used as security devices in the fields of authentication, identification and security.

The production of zero-order diffractive microstructures having special colour effects—for example, colour change upon tilting and/or rotation—for use as security devices in a variety of applications like (but not restricted to) banknotes, credit cards, passports, tickets, document security, anti-counterfeiting, brand protection and the like is known. The devices can be in the form of hot or cold transferable labels, adhesive tags and the like. They can significantly decrease the possibility of counterfeiting compared to state of the art security devices possessing security printing techniques, optically variable devices (OVDs) like optically variable inks (OVI) or diffractive optically variable image devices (DOVIDs), UV/IR fluorescent dyes, magnetic stripes etc.

It is known to use DOVIDs like holograms for anti-counterfeiting of banknotes or credit cards. Further magnetic codes or fluorescent dyes are often used to proof the originality of items. Unfortunately it is already possible to produce high quality counterfeited versions of devices using all those techniques. Additionally, DOVIDs possess only a low level of security, as non-experts generally do not know what the holographic image looks like. Therefore there is a need for novel security devices that are more difficult to counterfeit.

OVIs, as disclosed in the U.S. Pat. No. 4,705,356, provide higher level of security, as it is easier for non-experts to observe a colour change than a complex image. Although OVI's are also difficult to manufacture, and therefore seem to be secure, their effect can be closely mimicked with colour-shifting inks that are used for decorative purposes and are commercially available from several companies (for example Colour Shift). This decreases the value of OVIs as anti-counterfeiting tool.

In the U.S. Pat. No. 4,484,797 colour filter with zero-order microstructures are described for use as authenticating devices. When evenly illuminated with non-polarized, polychromatic light such devices show unique colour effects upon rotation and therefore can be clearly identified. The possibilities for varying the colour effect are limited (see M. T. Gale "Zero-Order Grating Micro-structures" in R. L. van Renesse, Optical Document Security, $2^{nd}$ Ed., pp. 277) and no individualization of the devices is claimed.

The WO 03/059643 also describes very similar zero-order diffractive gratings for use in security elements. The elements have the same drawbacks as the filters in the U.S. Pat. No. 4,484,797.

SUMMARY

It is an object of the present invention to mitigate one or more of these drawbacks of the state of the art.

In a first aspect the invention provides a security device comprising a zero-order diffractive microstructure buried within a substrate and a further structure comprising one or more optical structures formed on a surface of the substrate to be viewed by a user that modifies the optical characteristics produced by the zero-order microstructure.

The further structure may comprise one or more optical structures such as prisms or microlenses formed on a surface of the substrate to be viewed by a user.

In one embodiment a second further structure may be formed on a rear surface of the substrate. A mirror may be formed on or behind the rear surface of the substrate or the further structure may be reflective. For maximum effect, the mirror should be preferable placed in a distance of less than two times the wavelength from the zero-order diffraction grating (for the visible spectrum, thus less than two microns away).

In an alternative embodiment the further structure may comprise a colour filter embedded in the substrate or applied to the surface of the substrate viewed by the user.

In a further embodiment the further structure may comprise a second zero-order diffractive grating with a different colour response as the first zero-order diffractive grating. This enhances the intensity and change of the colour spectrum of the device.

In a further embodiment the further structure may comprise a material embedded in or applied to the surface of the substrate, which material may be locally optically modified by irradiating the surface of the substrate.

In a second aspect the invention provides a method of manufacturing a security device comprising the steps of:

forming a zero-order diffractive microstructure in a substrate;

and forming a further structure in or on a surface of the substrate capable of modifying the optical characteristics as viewed at that or another surface of the substrate by a user.

The further structure may be formed on the surface of the substrate viewed by the user and comprises an optical structure.

In a first embodiment the further structure may be formed by ink-jet printing.

In an alternative embodiment the further structure may be formed by embossing.

In a further embodiment the further structure may be formed by providing a colour filter between the surface of the substrate viewed by the user and the zero-order diffractive microstructure or on the surface of the substrate viewed by the user.

In one embodiment the further structure may be formed behind the zero-order diffractive microstructure and may be reflective.

A still further embodiment comprises the further steps of:

embedding an optically modifiable material in the substrate;

and locally optically modifying the material.

The method may further comprise the step of irradiating the optically modifiable material to modify an optical property thereof. A laser may be used to modify an optical property.

The present invention enables the provision of methods for modifying and/or structuring, especially individualizing, zero-order diffractive microstructure security devices, for example by adding serial numbers, one- or two-dimensional barcodes, images and the like. In particular, methods for carrying out such modifications after the production process but on-site, for example, at any point of the supply chain, may be provided by this invention.

The invention also enables the provision of new methods for mass production of such devices at low costs.

The present invention also enables measurement and identification of such zero-order diffractive microstructures even with low-cost handheld devices as described in WO 2004/034338 or inter alia in U.S. Pat. No. 6,473,165.

BRIEF DESCRIPTION OF THE DRAWINGS

FIG. 1 shows schematically the printing of microlenses on top of a rough surface of substrate by an ink-jet printer.

FIGS. 2a and 2b show saw tooth like macroscopic structures on various surfaces of a device.

DETAILED DESCRIPTION

Figure 3:
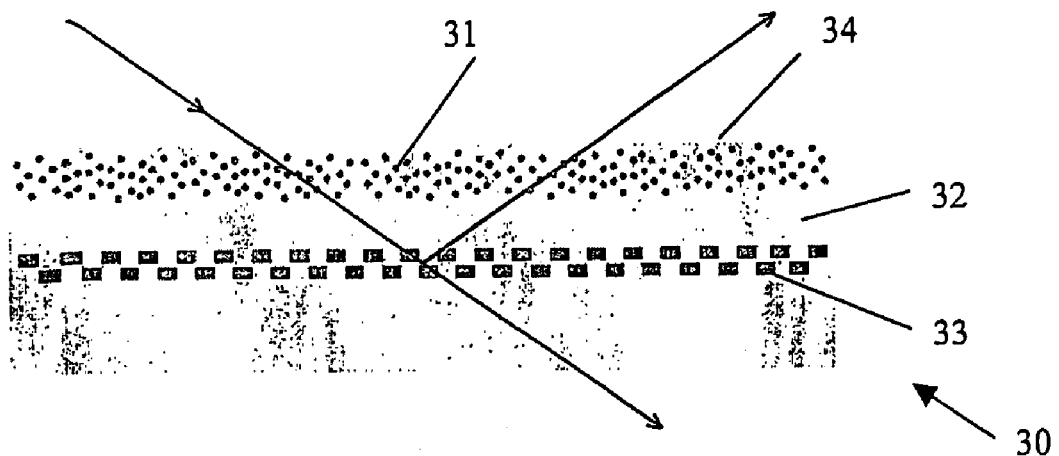
FIG. 3 shows a schematic drawing of a security device containing chromophores.

Zero-order diffractive microstructures, particularly gratings, illuminated by polychromatic light are capable of separating zero diffraction order output light from higher diffraction order output light. Such structures, for example, consist of parallel lines of a material with relatively high index of refraction n surrounded with (or at least in one half space adjacent to) a material with lower index of refraction. The structure acts as a kind of Waveguide. An advantageous production method is to emboss the microstructure in a polymer web by a roll-to-roll process and afterwards coat the web with ZnS in a roll-to-roll evaporation process. The material above and below the high index microstructure can have a different index of refraction. All materials above the microstructure have to be transparent (which means transmission T>50%, preferably T>90%) at least in a part of the visible spectral range. The spacing between the lines should be in the range of 100 nm to 900 nm, typically between 200 nm to 500 nm (sub wavelength structure). These microstructures possess characteristic reflection and transmission spectra depending on the viewing angle and the orientation of the structure with respect to the observer (see M. T. Gale "Zero-Order Grating Microstructures" in R. L. van Renesse, Optical Document Security, $2^{nd}$ Ed., pp. 267-287). Other parameters influencing the colour effect are, for example, the period y, the grating depth t, the fill factor f and the shape of the microstructure. Furthermore, the grating lines can be connected or vertically or horizontally disconnected. The shape of the lines can be rectangular, sinusoidal or more complex. In reflection, diffractive microstructures operate as coloured mirrors, in which the colour of the mirror varies with the viewing angle. As long as the materials used show no absorption the transmission spectra are the complement of those in reflection.

A unique feature of such structures is a colour change upon rotation. Supposing a non normal viewing angle, for example 30°, and grating lines parallel to the plane containing the surface normal and the viewing direction, one reflection peak can be measured which splits symmetrically into two peaks upon rotation. A well-known example of such a rotation effect is a red to green colour change (one peaks moves from the red to the green part of the spectrum the second peak moves from the red part to the invisible infrared part).

Combining zero-order diffractive microstructures with macroscopic optical structures (size >2 µm) modifies the colour effect and/or enables the addition of information to the security device (especially to individualise it). As the added information is directly connected with the security device it is as secure as the security device.

One way to do this is to modify the surface of the security device. For example, changing the roughness of the surface alters the colour effect due to changes in the scattering of light. A rough surface leads to a very weak colour effect. Coating the rough surface with a suitable, at least partially transparent material can restore the colour effect. One possible way to coat the surface on-site is to use ink-jet printing. Other possibilities are screen-printing and the like or locally melting the material of the rough surface (for example by laser irradiation). Another possibility is to locally roughen (for example mechanically) a flat surface to destroy the colour effect at certain areas. Again a macroscopic structuring can be obtained.

Inhomogeneous coatings of the surface are of particular importance. By adding optical structures like lenses or prisms and the like on top of the surface (see FIG. 1) the colour effect can be restored and/or modified. Such modification changes the optical path, for example, alters the incident angle. For example, if such lenses are large enough the human eye can see different colours at different positions of each lens as each position shows the colour effect of a different incident angle. Tilting such a security device produces a multicolour effect. If the lenses are small enough (so called micro-lenses) the human eye will recognize an average of the different colours and therefore an unusual effect. The lenses can possess spherical or aspherical shape and they can be convex or concave. Depending oh the type of the macroscopic optical structures the colour change upon tilting the security device can be enhanced or reduced. An asymmetric shape of the macroscopic optical structures (for example, rod like lenses) even alters the colour effect upon rotation.

The formation of the macroscopic optical structures depends on the coating technique and coating parameter (for example viscosity, web speed), the coating material and the material of the coated surface. The wettability of the surface is one of the key factors. The structure formation can be optimised by modifying the surface for example by irradiation, plasma treatment, prior primer coatings etc. The modification can be laterally structured forcing the following coating to take the same or a similar lateral shape. For example, spherical lenses can be obtained by coating a primer onto the surface, which is not wettable by the material used for the macroscopic optical structures, while leaving round areas free (Moench et. al., J. Opt. A: Pure Appl. Opt., Vol. 6, 2004, 330-337).

Another possible way of producing macroscopic optical structures on top of the surface is to use the phase separation or the dewetting effect of polymer films. Both are known to produce well-defined structures with controllable size by a self-assembly-process (Gutmann et. al., Appl. Phys. A, Vol. 74, 2002, S463-S465 and Moller-Buschbaum, J. Phys.: Condens. Matter, Vol. 15, 2003, R1549-R1582).

Another advantageous combination of zero-order microstructures with macroscopic optical structures is to provide the surface and/or an interface and/or the rear (if it is covered by a mirror or is otherwise reflective) of the security device with an asymmetric structure, for example by hot or cold lo embossing. These structures can be in the form of a saw tooth or an asymmetric sinus and the like (see FIG. 2). Among other things they can change the incident angle. One effect is that it enables recognition of the rotating effect even at perpendicular viewing direction.

Yet another advantageous combination of zero-order micro-structures with macroscopic optical structures is to provide the surface and/or an interface of the security device with a hologram structure. Thus the typical rainbow effect of holograms is combined with the characteristic colour effect of zero-order microstructures. Further the colour effect is modified as the hologram structure changes the incident angle of light.

A further method for modifying the colour effect of zero-order microstructures and/or adding information to the security device is to add a material with colour filter function between the surface of the device and the microstructures. This can be done by printing onto the surface or by incorporating into the polymer substrate. Such materials are, for example, all kinds of chromophores including fluorophors, phosphorescent dyes, nano-particle like Q-Dots or metallic nano-particles and the like. The colour filter modifies the spectra of the incident light as well as of the reflected light at the microstructures (see FIG. 3). Thus unusual colour effects can be obtained. Especially fluorophors coated onto (or placed at a short distance from) the high index material enable the production of unusual effects due to the enhancement of the excitation caused by the evanescent field near the Waveguide or additional interference effects.

Figure 4:
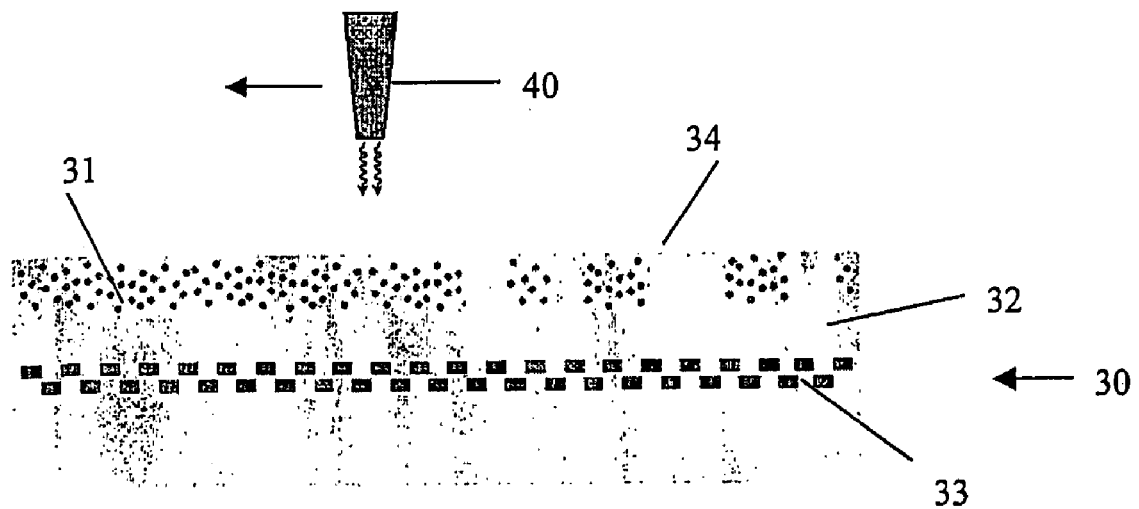
FIG. 4 shows schematically the writing of a barcode into a security device.

An advantageous construction is to use bleachable chromophors. By locally controlled high intensity irradiation with the desired wavelength a macroscopic lateral structure can be written into the security device. FIG. 4 schematically depicts the writing of an individual barcode into a security device by bleaching a chromophore incorporated into the polymer by a laser. An alternative is to use a laser intensity, which locally destroys the high index material or the surrounding polymer. If a mirror is placed at a defined distance to a chromophore a locally confined melting of the surrounding polymer followed by a bubble formation can by obtained due to the occurrence of a standing wave (similar to the production of CDs). Such bubbles scatter light and therefore alter or destroy the colour effect.

Yet another advantageous construction is to use photochrome polymers, which irreversibly alter their index of refraction upon irradiation with a defined wavelength and intensity. Thus at irradiated areas a different colour appears from that at non-irradiated areas.

Yet a further method for modifying the colour effect of zero-order microstructures and/or adding information to the security device is to use a wet coating process for example flexo-printing, gravure printing, ink-jet-printing or screen-printing, curtain or dip coating, spraying, sol-gel processes (especially UV or thermal curable sol-gel technique) and the like for depositing the high index of refraction material. Possible (but not limited to) organic materials or lacquer containing them are highly brominated vinyl polymer, nitrocellulose NC, PC, PEI, PEN, PET, PI, polyphenylen, polypyrrol, PSU, polythiophen, polyurethane PU. Other possible materials are inorganic/organic compound materials like (but not limited to) ORMOCER™ (an inorganic-organic hybrid polymer) or mixtures of nano-particle and polymer like (but not limited to) PbS and gelatine. The latter possess indices of refraction up to 2.5 (Zimmermann et. al. J. Mater. Res., Vol. 8, No. 7, 1993, 1742 1748). Lacquers containing Al2O3 or TiO2-particle are also possible. If the nano-particles are porous the wet coated layer can be used as a low index material, too. Such a layer consisting of porous nano-particle, embedded in a polymer matrix, can possess an index of refraction of down to 1.1.

Figure 5:
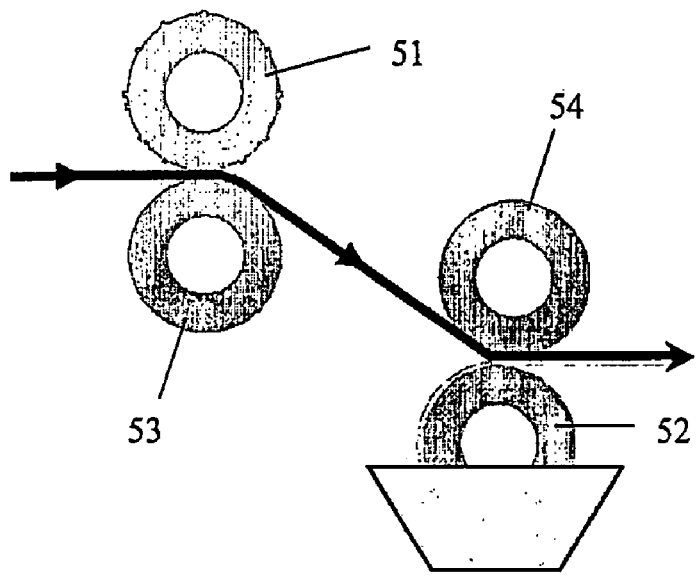
FIG. 5 shows schematically a roll-to-roll production process.

On one hand such wet coating processes are less expensive than vacuum coating processes. On the other hand they possess the ability to deposit the layers laterally structured. Especially roll coating processes can easily produce structured coatings by just structuring the roll (for example with Logos, text, pictures and the like). FIG. 5 schematically depicts a roll-to-roll production process, which combines the embossing of the foil and the printing of the layers.

Figure 6:
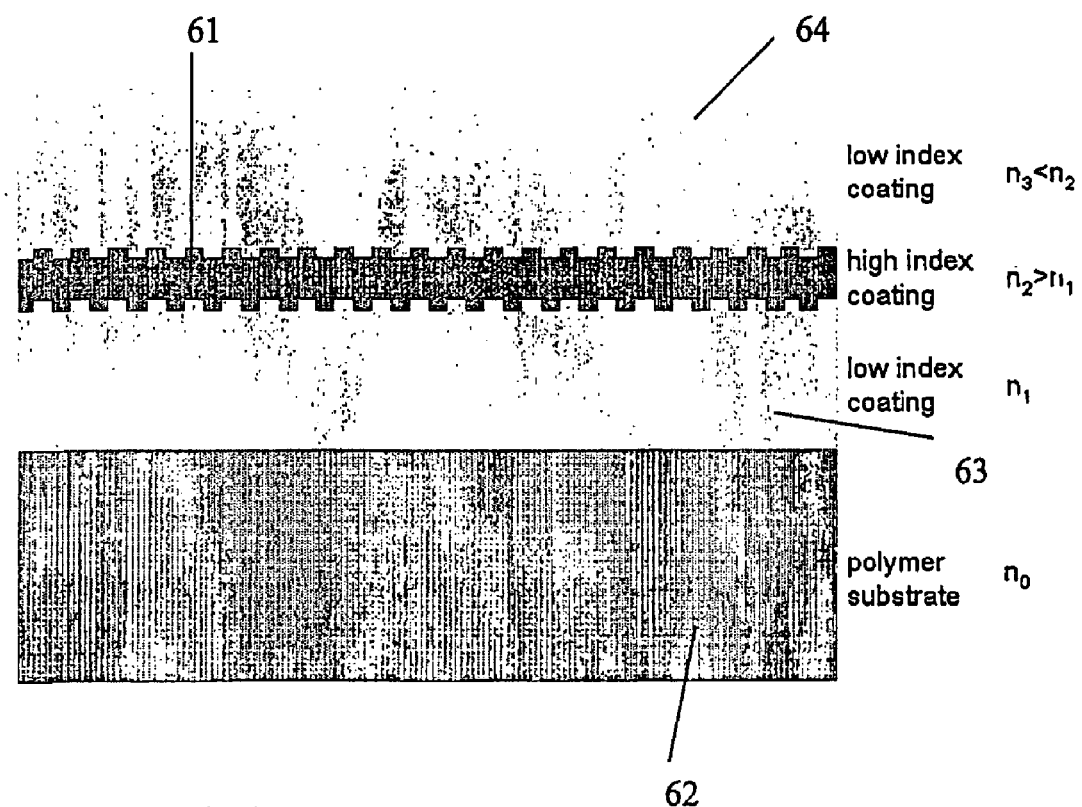
FIG. 6 shows schematically an inverted layer setup with zero ordered microstructures.

As most polymers possess an index of refraction below 1.7 the desired layered structure can be inverted. In more detail, one wet coated layer acts as the high index material (for example n1.5) and another wet coated layer as the low index material (for example n1.1). FIG. 6 shows the multi-layer setup of such an inverted zero-order microstructure. Especially curtain coating is suitable to coat such multi-layers of different materials not only in one run but simultaneously. Such an inverted multilayer setup avoids the leak of high index polymers.

FIG. 1 shows schematically the printing of micro-lenses 1 on top of a rough surface 2 of a substrate 3 by ink-jet-printing. The inkjet printing head 4 deposits the micro-lenses at desired points on the rough surface 2. The material used for the lenses fills the valleys of the rough surface 2 and forms lenses 1 due to an optimised surface tension. A zero-order diffractive microstructure 5 is embedded in the substrate 3.

FIG. 2a) depicts saw tooth like macroscopic structures 20 at the surface viewed by a user of a security device 21 having a zero-order diffractive microstructure 22 embedded therein.

FIG. 2b) depicts a sawtooth like macroscopic structure 23 at the rear surface of the device 21, which is coated with a mirror (b). Those structures change the incident and/or emergent angle of light.

FIG. 3 is a schematic drawing of a security device 30 containing chromophores 31 in the polymer 32 between the microstructures 33 and the top surface 34. The chromophores absorb a certain part of the incoming as well as the outgoing light. In the drawing refraction of the light was neglected.

FIG. 4 depicts schematically the writing of a barcode into a security device of the type shown in FIG. 3 by bleaching chromophores incorporated into the polymer by a laser 40.

FIG. 5 depicts schematically a roll-to-roll production process, which combines the embossing rollers 51 (left) and the printing of the high index material by means of rollers 52 (right). The counter pressure rollers 53 and 54 enable well defined embossing and printed layer thickness.

FIG. 6 shows schematically an inverted layer setup with zero ordered microstructures 61. The substrate 62 with relatively high index of refraction is coated with a multilayer structure in which the micro-structured high index coating 61 is embedded between two low index layers 63 and 64.

Figure 7:
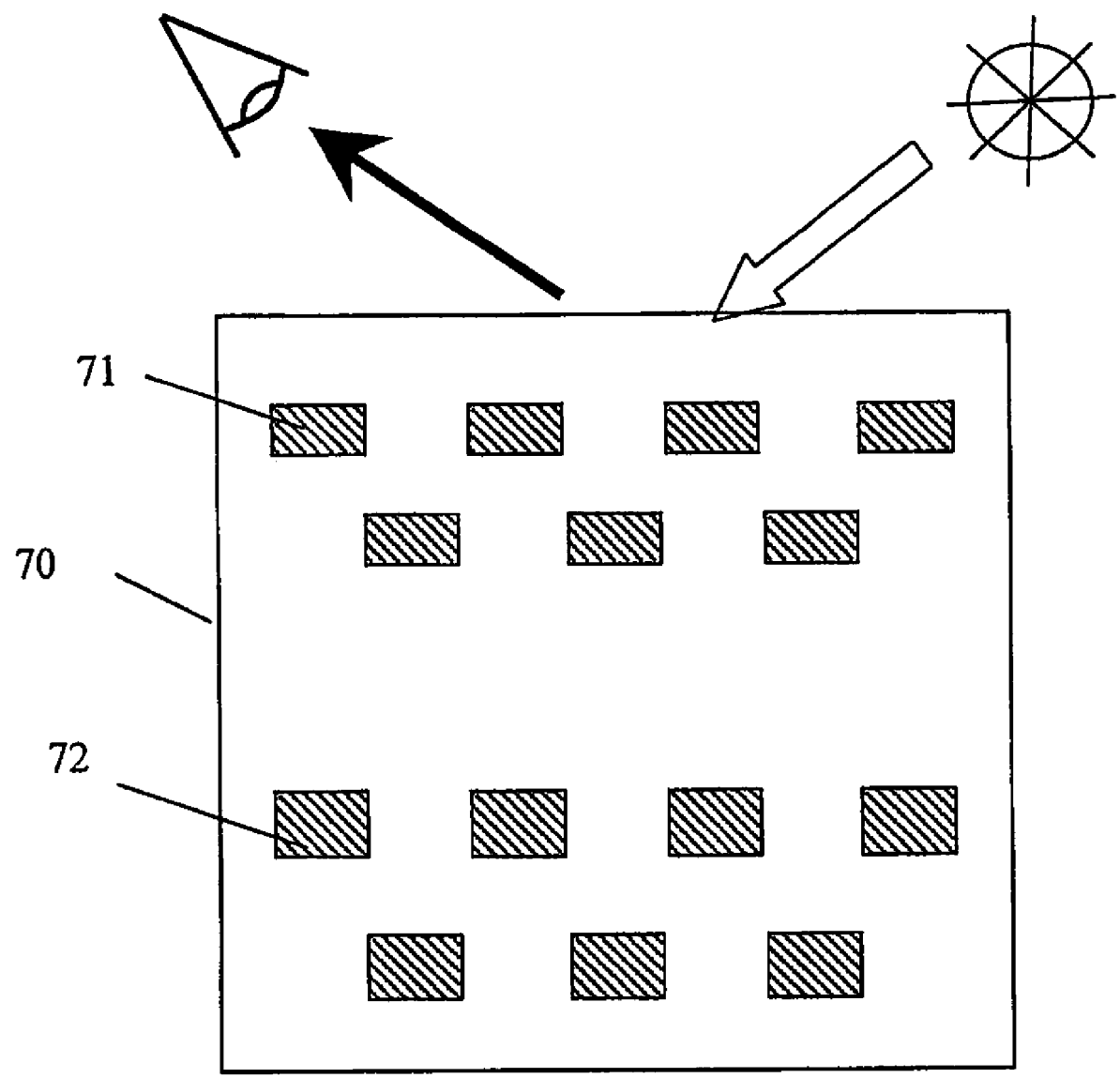
FIG. 7 shows schematically a substrate having two consecutive zero-ordered microstructures, one on top of each other.

FIG. 7 shows schematically a substrate 70 having two consecutive zero-ordered microstructures 71 and 72 one on top of each other for enhancing the colour response. It may be viewed in reflection as transmission.

The invention claimed is:

1. A security device comprising:
    a homogeneous zero-order diffractive microstructure to display a colour change on tilting or rotating the homogenous zero-order diffractive microstructure, the homogenous zero-order diffractive microstructure being buried within a substrate and comprising spaced lines of material, with spacing between the lines in a range of 100 nm to 900 nm, and wherein the zero-order diffractive microstructure has an index of refraction higher than an index of refraction of the substrate, the zero-order diffractive microstructure configured to act as a waveguide; and
    a further structure comprising a plurality of spherical or aspherical micro-lenses formed on a surface of the substrate over the homogeneous zero-order diffractive microstructure, the plurality of micro-lenses being sufficiently small that when viewed by a user an average of different colours will be observed, and wherein the further structure is configured such that the plurality of micro-lenses reduces the colour change produced by the zero-order microstructure upon the device being tilted.

2. A security device as claimed in claim 1 comprising a second further structure formed on a rear surface of the substrate.

3. A security device as claimed in claim 2 in which the second further structure is reflective.

4. A security device as in claim 1 in which a second zero-order diffractive microstructure is buried within the substrate.

5. A security device as claimed in claim 1 in which the further structure comprises a colour filter applied to the surface of the substrate viewed by the user.

6. A security device as claimed in claim 1 further comprising a colour filter embedded in the substrate.

7. A security device as claimed in claim 1 in which the further structure comprises a material embedded in or applied to the surface of the substrate, which material may be locally optically modified by irradiating the surface of the substrate.

8. A security device as claimed in claim 1 in which the further structure is formed by applying a surface treatment to the substrate surface to be viewed by a viewer.

9. A security device as claimed in claim 1, in which the micro-lenses are of size greater than 2 µm.

10. A security device as claimed in claim 1, in which the plurality of micro-lenses is laterally structured to form a serial number, a one- or two-dimensional barcode, or an image.

11. A method of manufacturing a security device comprising the steps of:
forming a homogeneous zero-order diffractive microstructure to display a colour change on tilting or rotating the homogenous zero-order diffractive microstructure, the homogenous zero-order diffractive microstructure being buried within a substrate and comprising spaced lines of material, with spacing between the lines in a range of 100 nm to 900 nm, and wherein the zero-order diffractive microstructure has an index of refraction higher than an index of refraction of the substrate, the zero-order diffractive microstructure configured to act as a waveguide; and
forming a further structure comprising a plurality of spherical or aspherical micro-lenses on a surface of the substrate over the homogeneous zero-order diffractive microstructure, the plurality of micro-lenses being sufficiently small that an average of different colours will be observed, and wherein the further structure is configured such that the plurality of micro-lenses reduces the colour change produced by the zero-order microstructure upon the device being tilted as viewed at the surface of the substrate by a user.

12. A method as claimed in claim 11 in which the plurality of micro-lenses is formed by ink-jet printing.

13. A method as claimed in claim 11 in which the plurality of micro-lenses is formed by embossing.

14. A method as claimed in claim 11 in which forming the further structure comprises providing a colour filter on the surface of the substrate viewed by the user.

15. A method as claimed in claim 11 in which the further structure is formed by selectively abrading the surface.

16. A method as claimed in claim 11 further comprising the steps of:
embedding an optically modifiable material in the substrate; and
locally optically modifying the material.

17. A method as claimed in claim 16 further comprising the step of irradiating the optically modifiable material to modify an optical property thereof.

18. A method as claimed in claim 17 in which a laser is used to modify an optical property.

19. A method as claimed in claim 11 comprising the step of forming a second further structure behind the zero-order diffractive microstructure.

20. A method as claimed in claim 19 in which the second further structure is reflective.

21. A method as claimed in claim 11, in which the micro-lenses are of size greater than 2 µm.

22. A method as claimed in Claim 11 in which the plurality of micro-lenses is formed by a wet coating process.

23. A method as claimed in claim 11 in which the plurality of micro-lenses is formed by a roll coating process.

* * * * *